INVENTOR.
M.A. ALBRIGHT
BY Young & Quigg
ATTORNEYS

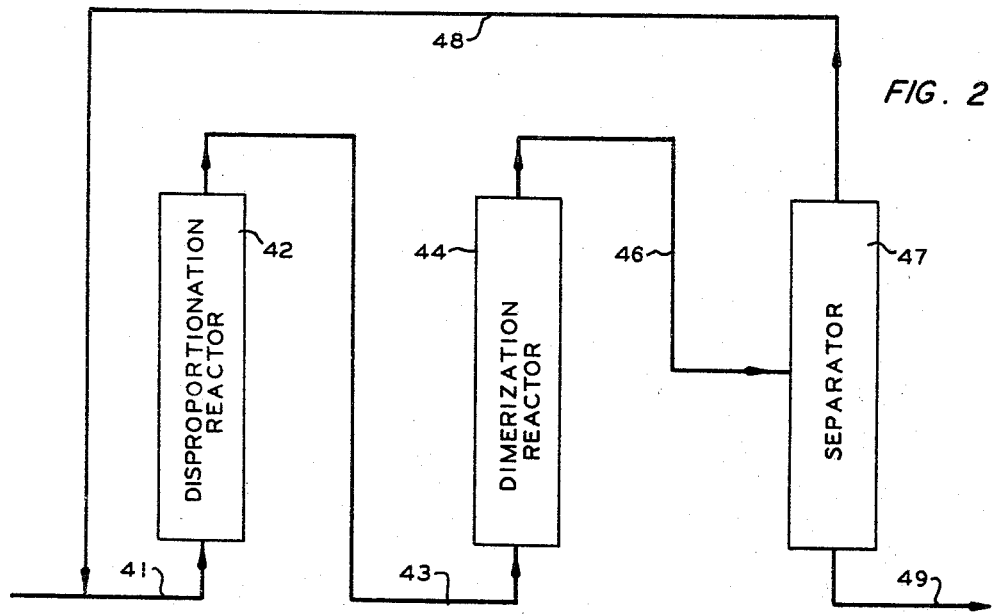
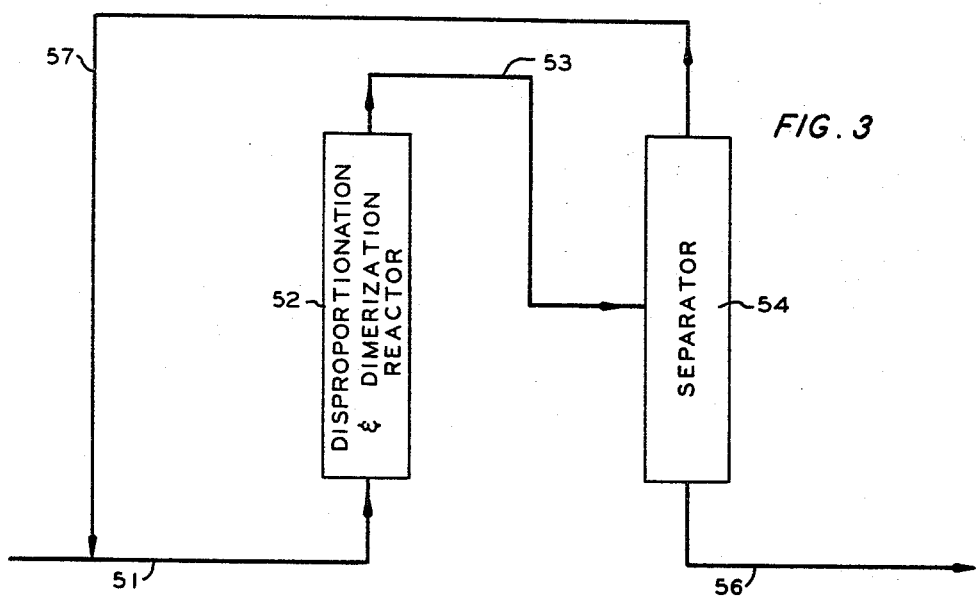

United States Patent Office 3,330,882
Patented July 11, 1967

3,330,882
DISPROPORTIONATION AND DIMERIZATION
Melvin A. Albright, Bartlesville, Okla., assignor to Phillips Petroleum Company, a corporation of Delaware
Filed Dec. 9, 1963, Ser. No. 331,334
10 Claims. (Cl. 260—683.15)

This application is a continuation-in-part of my co-pending application Ser. No. 253,574, filed Jan. 24, 1963 and now abandoned.

This invention relates to the catalytic disproportionation of olefin hydrocarbons. In one aspect the invention relates to the conversion of an olefin to a heavier olefin by a combination of disproportionation and polymerization. In another aspect the invention relates to the conversion of an olefin to a heavier olefin by disproportionation followed by polymerization of a lighter produced product to produce additional quantities of a heavier product. In another aspect the invention relates to a process for producing a diolefin by disproportionation of an olefin, polymerization of a lighter fraction of the disproportionated product, and dehydrogenation of a heavier fraction of the product and the polymerized product. In another aspect the invention relates to a process for the production of an alkylated hydrocarbon comprising disproportionating an olefin, polymerizing the lighter fraction of the disproportionated product, and alkylating a hydrocarbon with a heavier fraction of the disproportionated product and the polymerized product. In another aspect the invention relates to processing apparatus.

In this application disproportionation is used to mean the conversion of a hydrocarbon into similar hydrocarbons of higher and lower numbers of carbon atoms per molecule. Disproportionation of olefins can be accomplished, as disclosed and claimed in Ser. No. 127,812, Banks, filed July 31, 1961, and now abandoned; Ser. No. 307,371, Heckelsberg, filed Sept. 9, 1963; and a copending application entitled "Olefin Disproportionation," filed Sept. 27, 1963; or by other process, using a catalyst comprising molybdenum oxide and aluminum oxide and preferably also an oxide of cobalt, tungsten oxide on alumina, molybdenum oxide or tungsten oxide on silica or on silica-alumina, tungsten carbonyl or molybdenum carbonyl on silica, alumina or silica-alumina, or other variations of these catalysts, tungsten sulfide or molybdenum sulfide on alumina, or by other disproportionation catalysts to produce a disproportionated product comprising a very small quantity of saturated hydrocarbons and a relatively small amount of branched chain olefins. Where the reactant comprises 1- or 2-olefins, a mixture of new products is obtained comprising primarily olefins, some having a larger and some a smaller number of carbon atoms than the feed, and also including some other disproportionated products. Conditions can be controlled to obtain a very high efficiency of conversion to desired disproportionation products. For example, propylene can consistently be converted to ethylene and butenes with an efficiency above 95 percent. Disproportionation to produce a feed-stock for catalytic dehydrogenation is disclosed and claimed in Ser. No. 201,666, Dixon, filed June 11, 1962, and now abandoned. When the desired olefin is heavier than the feedstock, I have found that a lighter product of the disproportionated product can be converted to a heavier product of the disproportionation for further processing. For example, when propylene is converted by disproportionation to butenes for further dehydrogenation to produce butadiene or for alkylation of other hydrocarbons, I have found it is desirable also to convert the ethylene produced by disproportionation into butenes. In this application the term "butene" is not limited to a single compound but includes the various $C_4$ olefins.

Also, in this application the word "polymerize" is used in a broad sense and means to change a compound into a higher molecular weight compound having the same elements in the same proportions but not limited to a simple addition. That is, the polymerized product need not be an even multiple of atoms of the starting material.

An object of my invention is to disproportionate an olefin hydrocarbon and to convert a lighter product of the disproportionation to a heavier product of the disproportionation.

Another object of my invention is to produce a heavier olefin from a lighter olefin.

Another object of my invention is to convert propylene into butene.

Another object of my invention is to produce butadiene from propylene.

Another object of my invention is to produce an alkylated hydrocarbon.

Another object of my invention is to provide apparatus for disproportionation and the conversion of a lighter product of the disproportionation to a heavier product of the disproportionation.

Other aspects, objects and advantages of my invention are apparent in the written description, the drawing, and the claims.

According to my invention an olefin is converted to a heavier olefin by contacting the feed olefin with a disproportionation catalyst and polymerizing at least a portion of the lighter product of the disproportionation to produce additional quantities of heavier olefin. Contact with a polymerization catalyst can be carried on in a single reactor with simultaneous or consecutive contact with the disproportionation and polymerization catalysts or can be carried on in separate disproportionation and polymerization reactors with or without intermediate separation. Where simultaneous contact is used the catalyst can be a mixture of disproportionation and polymerization catalysts, or can be a single base promoted with disproportionation and polymerization promoters.

Further according to my invention an olefin is converted to a heavier olefin by contacting the feed with a disproportionation catalyst to produce a disproportionated product comprising a lighter olefin and a heavier olefin, separating the lighter olefin from the heavier olefin and polymerizing the lighter olefin to produce additional quantities of the heavier olefin. Propylene is converted to butenes by my invention by disproportionating the propylene, separating the produced ethylene and dimerizing to butenes.

Further according to my invention butadiene is produced by treating propylene with a combination of disproportionation and dimerization to produce butene and dehydrogenating butene to produce butadiene.

Further according to my invention butadiene is produced by disproportionating propylene to produce ethylene and butene, separating the ethylene from the butene, dimerizing the ethylene to produce additional quantities of butene, and dehydrogenating at least a portion of the butene to produce butadiene.

Further according to my invention butadiene is produced by disproportionating propylene to produce ethylene and butene, separating the ethylene from the butene, dimerizing the ethylene to produce additional quantities of butene, combining the two butene streams and dehydrogenating at least a portion of the combined stream to produce butadiene.

Further according to my invention an alkylated hydrocarbon is produced by treating propylene with a combination disproportionation and dimerization process to produce butene and contacting butene with a hydrocarbon to produce a desired alkylated hydrocarbon.

Further according to my invention an alkylated hydrocarbon is produced by disproportionating propylene to produce ethylene and butene, separating the ethylene from the butene, dimerizing the ethylene to produce additional quantities of butene, combining the two butene streams and contacting at least a portion of the combined stream with a hydrocarbon to produce the desired alkylated hydrocarbon.

Further according to my invention butadiene and an alkylated hydrocarbon are produced by treating propylene with a combination of disproportionation and dimerization to produce butene, dehydrogenating a portion of the butene to produce butadiene and contacting another portion of the butene with a hydrocarbon to produce a desired alkylated hydrocarbon.

Further according to my invention butadiene and an alkylated hydrocarbon are produced by disproportionating propylene to produce ethylene and butene, separating the ethylene from the butene, dimerizing the ethylene to produce additional quantities of butene, dehydrogenating a portion of the butene to produce butadiene, and contacting a portion of the butene with a hydrocarbon to produce the desired alkylated hydrocarbon.

Further according to my invention butadiene and an alkylated hydrocarbon are produced by disproportionating propylene to produce ethylene and butene, separating the ethylene and butene, dimerizing the ethylene to produce additional quantities of butene, combining the two butene streams, dehydrogenating a portion of the combined stream to produce butadiene and contacting a portion of the butene with a hydrocarbon to produce the alkylated hydrocarbon.

Further according to my invention an alkylated hydrocarbon is produced by disproportionating propylene to produce ethylene and butene, separating the ethylene and the butene, dimerizing the ethylene to produce additional quantities of butene, and contacting at least a portion of the butene with a hydrocarbon to produce the desired alkylated hydrocarbon.

Examples of olefins which are subjected to disproportionation according to the process of this invention include acyclic 1- and 2-alkenes having from 3 to 16 carbon atoms. Some specific examples of such olefins are propylene, 1-butene, 2-butene, 1-pentene, 2-pentene, 1-hexene, 2-heptene, 1-octene, 2-nonene, 1-dodecene, 2-tetradecene, 1-hexadecene, 2-methyl-1-butene, 2-methyl-2-butene and 3-methyl-1-butene. Higher disproportionation conversion and wider product distribution are obtained with 1-olefins than with 2-olefins. Any catalyst suitable for disproportionating olefins can be used in the practice of my invention. One catalyst used in my invention comprises an oxide of aluminum promoted by an oxide of molybdenum and, preferably, additionally promoted by an oxide of cobalt. Suitable supports include 100 percent alumina, silica-alumina wherein the amount of silica is up to about 25 percent of the total support; magnesia-alumina wherein the amount of magnesia is up to about 20 percent of the total support; and titania-alumina wherein the amount of titania is up to about 85 percent of the total support.

The amount of molybdenum oxide or tungsten oxide is in the range of 0.5 to 30 percent by weight of the total catalyst composition, preferably 1 to 15 percent. Cobalt oxide can be present in the molybdenum promoted catalyst in the range of 0 to 20 percent by weight of the total catalyst, preferably 1 to 5 percent. Excellent results with high conversion have been obtained with molybdenum oxide in the range of 4 to 13 percent by weight of the total catalyst.

The composite catalyst can be prepared by any conventional method, such as dry mixing, coprecipitation or impregnation. For example, a 10–100 mesh alumina (having a 178 m.²/g. surface area and a 107 A. pore diameter) is impregnated with an aqueous solution of a molybdenum compound, such as ammonium molybdate, which is convertible to the oxide upon calcination. A commercially available catalyst comprising 12.8:3.8:83.4

$$MoO_3\text{-}CoO\text{-}Al_2O_3$$

having a 208 m.²/g. surface area and a 96 A. pore diameter is also satisfactory, the ratios being by weight.

As noted above, the process of my invention can be carried out with simultaneous disproportionation and polymerization in a single bed, using either a mixture of catalyst or a single catalyst promoted for both reactions. When a single catalyst is used the catalyst has the following compositional ranges in weight percent:

| Component | Broad | Preferred |
|---|---|---|
| Disproportionation promoter | 1–30 | 3–15 |
| Polymerization promoter | 0.01–10 | 0.1–5 |
| Support | 60–99 | 80–97 |

The disproportionation promoters are selected from the group consisting of molybdenum oxide, molybdenum sulfide, molybdenum hexacarbonyl, tungsten oxide, tungsten sulfide, tungsten hexacarbonyl. Molybdenum oxide is the preferred promoter. Although not a disproportionation promoter in the strict sense, cobalt oxide, in minor amounts, is frequently found useful in the catalyst composite.

The polymerization promoters are selected from the group consisting of nickel oxide, nickel sulfate, and nickel chloride.

The support is selected from the group consisting of alumina, silica, silica-alumina, titania-alumina (containing 1–85 wt. percent titania), magnesia-alumina (containing 0.1–20 wt. percent magnesia), magnesia-silica (containing 10–80 wt. percent magnesia), and other suitable materials.

These catalysts can be prepared by any conventional technique such as dry mixing, impregnation, co-precipitation, and the like. The different promoters can be distributed on the support either simultaneously or consecutively. A preferred technique is to co-impregnate a suitable support with both promoters simultaneously. After the composite is prepared it is activated by heating at temperatures up to 1600° F. in air for periods of 0.1 to 25 hours depending upon the catalyst component chosen. For a nickel oxide-molybdenum oxide-alumina catalyst, heating for about 5 hours in flowing air at 1000° F. is satisfactory.

The support component of the catalyst can be any conventional catalytic grade material and can be prepared by such techniques as gelation, co-precipitation, flame hydrolysis, aerogel formation, and the like. These materials can range from fine powders to coarse granules. The finished catalysts, prepared from such materials, can also be in the form of powders or granules, as well as in other shapes such as agglomerates, pellets, spheres, extrudates, and the like, depending upon the contacting technique.

When a combined catalyst and a single step disproportionation and polymerization reaction are used, conditions are selected so that appreciable amounts of both reactions are obtained. The process can be carried out in the vapor or liquid phase at temperatures from about 100° F. to about 700° F., preferably 200 to 500° F., at pressures of 0 to 1500 p.s.i.g. In continuous operations, gaseous space velocities in the range of 6 to 3000 vol./vol./hour or weight hourly space velocities of 0.1 to 400 wt./wt./hour are used. In batch reactions, the catalyst comprises from about 0.1 to about 40 weight percent of the reaction mixture and reaction times of about 1 minute to about 20 hours are used.

Before use in the disproportionation reaction, the above-described composite catalysts are activated by a heat treatment. The heat treatment is selected as one suitable for the particular catalyst selected.

The process of my invention can be carried out either batchwise or continuously, using a fixed catalyst bed, or a stirrer-equipped reactor or other mobile catalyst contacting process as well as any other well known contacting technique. Preferred reaction conditions, e.g., temperature, pressure, flow rates, etc., vary somewhat depending upon the specific catalyst composition, the particular feed olefin, desired products, etc.

The disproportionation reaction can be carried out either in the presence or absence of a diluent. Diluents selected from the group consisting of paraffinic and cycloparaffinic hydrocarbons can be employed. Suitable diluents are, for example, propane, cyclohexane, methylcyclohexane, normal pentane, normal hexane, isooctane, dodecane, and the like, or mixtures thereof, including primarily those paraffins and cycloparaffins having up to 12 carbon atoms per molecule.

The desired dimerization is carried out by any suitable dimerization process as, for example, that disclosed in Bailey et al. 2,581,228 (1952); Bailey et al. 2,381,198 (1945); and others.

At the end of the reaction period, the hydrocarbon phase is separated from the solid catalyst by known methods and subjected to product recovery. Such techniques as fractionation, solvent extraction, and the like, can be employed for separation of products. Unconverted feed materials or products not in the desired range can be recycled.

My invention is particularly adapted to a conversion in which dimerization of a light product results in additional quantities of a heavier product. In the conversion of propylene the primary disproportionation products are ethylene and butylene, and dimerization of the ethylene results in additional quantities of butylene.

Catalysts, conditions, etc. for producing diolefins from olefin feedstocks by dehydrogenation are well known and need not be discussed in detail at this point. For example, a suitable dehydrogenation process is disclosed in U.S. 2,866,790.

Similarly, the alkylation step is well known, a suitable process being disclosed in U.S. 2,984,693.

In the drawing:

FIG. 2 is a diagrammatic representation of a process in which disproportionation is followed by dimerization without an intermediation separation.

FIGURE 3 illustrates a process in which simultaneous disproportionation and dimerization are carried on in a single reactor.

Figure 1:
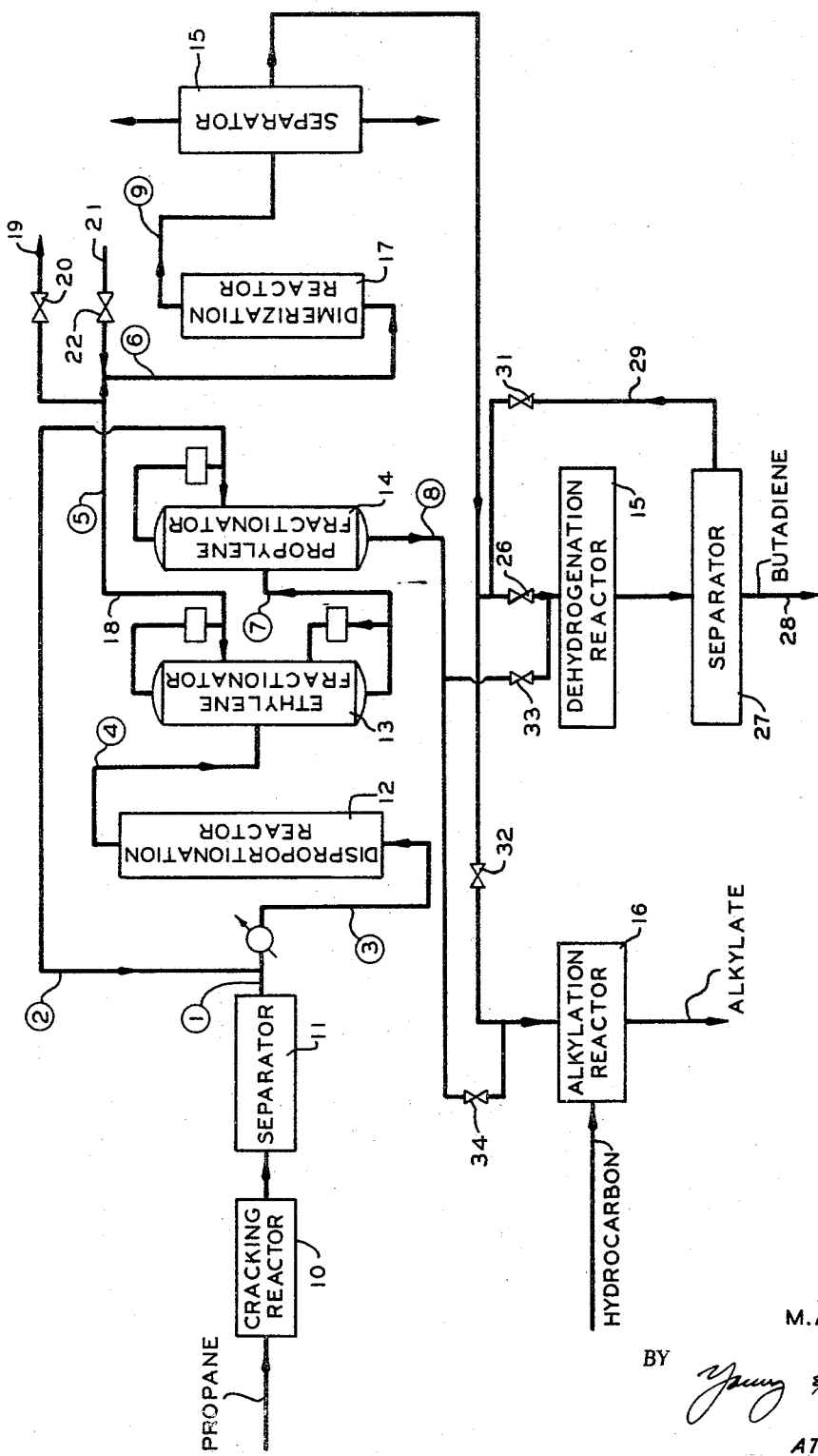
FIGURE 1 is a diagrammatic representation of a process involving disproportionation, separation of the lighter from heavier products, followed by dimerization of the lighter material.

In FIGURE 1 a propane stream is subjected to cracking in cracking reactor 10, the cracked products are separated in separator 11, and a stream of proplene fed to disproportionation zone reactor 12. In ethylene separator 13 and propylene separator 14 the product stream from disproportionation reactor 12 is separated to produce ethylene, butene and unreacted propylene. The propylene can be returned as recycle to the disproportionation means. The butene is passed to further processing means such as dehydrogenation reactor 15 and alkylation reactor 16. The ethylene is passed to dimerization reactor 17 wherein additional butene is produced and combined with the butene recovered from fractionator 14. To give the desired flexibility of operation the ethylene conduit 18 from fractionator 13 is connected with a product ethylene conduit 19 through valve 20, and with a feed ethylene line 21 through valve 22. When more ethylene is produced by the disproportionation step than is needed in the dimerization step, the additional ethylene can be removed as ethylene product through conduit 19 while, when more ethylene is required than is produced, additional can be fed through conduit 21.

Separator 15 is provided for the effluent from dimerization reactor 17. Separator 15 is a schematic representation of the necessary means to perform the necessary separations. In the propylene-ethylene-butene system described, this includes means to remove products heavier than butene, means to remove ethylene and propylene, and means to remove any dissimilar product such as benzene, for example.

Where desirable and convenient, the fractionators 13 and 14 can be utilized by returning to this point the dimerization reactor effluent less the products heavier than butene. In this instance only a single ultimate butene effluent stream is produced.

When the production of butadiene is an object of the operation, butene is fed through valve 26 or valve 33 to dehydrogenation reactor 15, and the dehydrogenated stream passed to separator 27, to recover butadiene through conduit 28 and unreacted butene through conduit 29. Valve 31 permits the recycle of unreacted butene.

When it is desired to alkylate a hydrocarbon, butene is fed through valve 32 or valve 34 into alkylation reactor 16 while a feed hydrocarbon also enters reactor 16 as shown and the alkylate is produced through conduit 36. By proper manipulation of valves 26, 32, 33 and 34, the butene can be fed from either or both sources to either or both of the dehydrogenation reactor 15 and the alkylation reactor 16.

In FIGURE 2 propylene enters disproportionation reactor 42 through conduit 41. The effluent stream from the reactor 42 passes through conduit 43 into dimerization reactor 44. The effluent from reactor 44 is passed through conduit 46 to separate means 47. Ethylene and propylene are recycled to conduit 41 through conduits 48 while the heavier product stream is recovered through conduit 49.

In FIGURE 3 a stream of propylene enters through conduit 51 into a combination disproportionation and dimerization reactor 52. The effluent from reactor 52 is passed through line 53 into separator means 54. The heavier product stream is removed from separator means 54 through conduit 56, while the lighter stream is returned through conduit 57 to conduit 51, to be recycled to reactor 52.

In the description of the apparatus of the drawing, many units customarily included in chemical processing plants, such as pumps, valves, controls, etc., have been eliminated to simplify the description of the invention.

My invention can also be practiced with more than one disproportionation step and more than one polymerization step. For example, where a heavier product is desired, a heavier product from the first disproportionation step can be subjected to a subsequent disproportionation to produce the desired product, and additional quantities of the product can be obtained by polymerization of one or more light products from the first or a subsequent disproportionation.

*Example 1*

In an example according to my invention, a stream comprising substantially pure propylene is fed to disproportionation reactor 12 where it is contacted with a catalyst comprising 12.8 weight percent $MoO_3$, 3.8 weight percent $CoO$, and 83.4 weight percent $Al_2O_3$, at a temperature of 325° F., a pressure of 450 p.s.i.a., and a weight hourly space velocity of 8. The effluent stream from reactor 13, comprising ethylene, propylene, 1-butene, cis-2-butene, trans-2-butene, and a small residue of $C_5$ and heavier, is passed to separator 13 and separator 14. The ethylene fractionator 13 is operated at 400 p.s.i.a. with ethylene being removed overhead. The bottoms fraction from the ethylene fractionator is passed to the propylene fractionator 14 which is operated at 350 p.s.i.a. with propylene being removed overhead, condensed, and pumped back to the feed to reactor 13. Ethylene from ethylene fractionator of separator 14 is fed to dimerization reactor 17 where it is contacted with a catalyst comprising nickel oxide on silica-alumina, made by applying a solution of nickel nitrate to a silica alumina base and treating at 1000° F. in air. Reactor 17 is operated at 390 p.s.i.a., 200° F. and a weight hourly space velocity of 500. The composition of the various streams is given in Table I, the column headings referring to the corresponding stream numbers circled on the drawing, with the exception of stream 10 which is a stream made by combining the total of streams 8 and 9. These streams are further identified below the table. This example demonstrates the practice of my invention, according to the embodiment of FIGURE 1.

*Example III*

In another example according to my invention, a stream comprising substantially pure propylene is fed into reactor 52 where it contacts consecutive separate beds of a catalyst comprising 12.8 weight percent $MoO_3$, 3.8 weight percent CoO, and 83.4 weight percent $Al_2O_3$, and a catalyst comprising nickel oxide on silica-alumina, made as described in Example II. Conditions are 400 p.s.i.g., 225°

TABLE I

| Basis: 40 Lbs. Fresh Feed | 1 | | 2 | | 3 | | 4 | | 5 | |
|---|---|---|---|---|---|---|---|---|---|---|
| | Wt. | Wt. Percent | Wt. | Wt. Percent | Wt. | Wt. Percent | Wt. | Wt. Percent | Wt. | Wt. Percent |
| Ethylene | | | | | | | 13.6 | 13.6 | 13.6 | 100 |
| Propylene | 40 | 100 | 60 | 100 | 100 | 100 | 60 | 60 | | |
| 1-butene | | | | | | | 1.7 | 1.7 | | |
| Cis-2-butene | | | | | | | 8.4 | 8.4 | | |
| Trans-2-butene | | | | | | | 15.6 | 15.6 | | |
| $C_5+$ | | | | | | | 0.7 | 0.7 | | |
| Total | 40 | 100 | 60 | 100 | 100 | 100 | 100 | 100 | 13.6 | 100 |

| Basis: 40 Lbs. Fresh Feed | 6 | | 7 | | 8 | | 9 | | 10 | |
|---|---|---|---|---|---|---|---|---|---|---|
| | Wt. | Wt. Percent | Wt. | Wt. Percent | Wt. | Wt. Percent | Wt. | Wt. Percent | Wt. | Wt. Percent |
| Ethylene | *13.6 | 100 | | | | | | | | |
| Propylene | | | 60 | 69.54 | | | | | | |
| 1-butene | | | 1.7 | 1.97 | 1.7 | 6.44 | 0.8 | 5.88 | 2.5 | 6.25 |
| Cis-2-butene | | | 8.4 | 9.73 | 8.4 | 31.7 | 4.2 | 30.9 | 12.6 | 31.45 |
| Trans-2-butene | | | 15.6 | 17.95 | 15.6 | 59.2 | 8.5 | 62.5 | 24.1 | 60.3 |
| $C_5+$ | | | 0.7 | 0.81 | 0.7 | 2.66 | 0.1 | 0.72 | 0.8 | 2.0 |
| Total | (*) | 100 | 86.4 | 100 | 26.4 | 100 | 13.6 | 100 | 40.0 | 100 |

*May be more or less as ethylene is withdrawn as product or fresh ethylene is fed.

*Example II*

In another example according to my invention a stream comprising substantially pure propylene is fed to disproportionation reactor 42 where it is contacted with a catalyst comprising 12.8 weight percent $MoO_3$, 3.8 weight percent CoO, and 83.4 weight percent $Al_2O_3$, at a temperature of 250° F., a pressure of 450 p.s.i.g., and a weight hourly space velocity of 8. The effluent stream from reactor 42 comprising ethylene, propylene, butene, and a small amount of $C_5$ and heavier is passed through pipe 43 into reactor 44. In reactor 44 the stream is contacted with a catalyst comprising nickel oxide on silica-alumina, made by applying a solution of nickel nitrate to a silica-alumina base and treating at 1000° F. in air. Reactor 44 is operated at 390 p.s.i.a., 200° F., and at 600 vol./vol. (STP). The composition of the various streams is given in Table II, the column headings referring to corresponding conduit numbers on the drawing. This example demonstrates the practice of my invention according to the embodiment of FIGURE 2.

F. and a weight hourly space velocity (feed) of 8. The effluent stream comprises approximately 40 weight percent propylene, 33 weight percent butene, 9 weight percent pentene, 14 weight percent hexene, and 4 weight percent heptene and heavier. This example demonstrates the practice of my invention according to the embodiment of FIGURE 3, using consecutive disproportionation and dimerization catalyst beds.

*Example IV*

In another example according to my invention, a stream of substantially pure propylene was fed into reactor 52, where it contacted a combined bed of 50 weight percent of the cobalt-molybdate on alumina catalyst and 50 weight percent of the nickel oxide on silica-alumina catalyst of Example III. Runs were made at atmospheric pressure at a space velocity of 10 vol./vol. (STP), at various temperatures. Results are given in Table III.

TABLE II

| | 41 | | 43 | | 46 | | 49 | | 48 | |
|---|---|---|---|---|---|---|---|---|---|---|
| | Mol | Wt. Percent | Mol | Wt. Percent | Mol | Wt. Percent | Mol | Wt. Percent | Mol | Wt. Percent |
| Ethylene | | | .194 | 12.93 | | | | | | |
| Propylene | 1 | 100 | .580 | 57.90 | .392 | 39.21 | | | .392 | 100 |
| Butenes | | | ¹.192 | 25.59 | .249 | 33.20 | .249 | 54.61 | | |
| Pentenes | | | ².015 | 2.50 | .056 | 9.39 | .056 | 15.45 | | |
| Hexenes | | | ².005 | 1.00 | .072 | 14.40 | .072 | 23.69 | | |
| Heptenes and Heavier | | | | | .016 | 3.80 | .016 | 6.25 | | |

¹ Mostly butene-2.
² Predominantly linear 2-olefins. Mol amounts are mol/mol feed to reactor.

TABLE III

| Temperature | 300° F. | 350° F. | 400° F. |
|---|---|---|---|
| Product (Wt. Percent): | | | |
| Ethylene | 0.91 | 1.10 | 0.66 |
| Propylene | 97.16 | 96.45 | 97.65 |
| 1-butene | 0.25 | 0.42 | 0.46 |
| Trans-2-butene | 1.04 | 1.28 | 0.75 |
| Cis-2-butene | 0.64 | 0.75 | 0.48 |
| Heavier liquid 1 to 2%, Ethylene Decrease (Percent) | 4 | 9 | 18 |

This illustrates the practice of my invention according to the embodiment of FIGURE 3 using a single mixed bed of catalyst.

It has been observed that operation under the same conditions, using a catalyst comprising only the disproportionation catalyst, the weight ratio of butenes to ethylene is very near 2 to 1. Therefore, the decrease in ethylene is calculated as the deviation from a theoretical 2 to 1 basis.

*Example V*

An alumina catalyst containing about 1 weight percent nickel (calculated as the metal but present as the oxide) and about 4 weight percent molybdenum (calculated and present as the oxide) was prepared. A quantity of catalytic grade alumina, having a 20–40 mesh size, was impregnated with a solution containing 1.0 gram $Ni(NO_3)_2 \cdot 6H_2O$ and 4.5 cc. of a molybdenum-containing stock solution (48.5 grams ammonium molybdate/200 cc.) in the ratio of 20 parts by weight of catalyst to 13.5 parts by weight of the solution. This composite was dried and then activated for five hours at 1000° F. in flowing air.

A quantity of the above-prepared catalyst was charged into a stainless steel reactor to form a catalytic bed. The reactor was heated by means of an electric furnace. Propylene was admitted into the reactor at a space velocity of about 2 vol./vol./minute and the reaction was continued for 105 minutes at 300 to 302° F. and 10 p.s.i.g. Chromatographic analysis of a sample of the reactor effluent taken at 36 minutes showed that propylene conversion was 20.4 percent and the product distribution was 26.6 weight percent ethylene, 61.6 percent butenes and 11.8 percent $C_5+$, indicating that both disproportionation and polymerization were occurring.

In comparison, a similar catalyst, except that no nickel oxide was present, when used to convert propylene under similar conditions gives a product distribution such as the following: ethylene 33.0 to 35.0 weight percent; butenes 63.0 to 65.0 weight percent; and $C_5+$ 0 to 2.0 weight percent. Thus it is seen that while the conversion to butenes (the major disproportionation product) is held essentially constant, the process also produces a substantial quantity of higher olefins (polymerization products) principally at the expense of the ethylene (also a disproportionation product).

Reasonable variation and modification are possible within the scope of my invention which sets forth method and apparatus for disproportionation and polymerization.

I claim:

1. The process for the conversion of an acyclic feed olefin having 3–16 carbon atoms per molecule to a heavier olefin, comprising the steps of:

contacting said feed olefin with an olefin disproportionation catalyst in a disproportionation zone under conditions to produce a disproportionated product comprising a lighter olefin and a heavier olefin;

polymerizing said lighter olefin in a separate polymerization zone to produce additional quantities of said heavier olefin; and recycling unconverted feed olefin to said disproportionation zone to produce additional quantities of said lighter olefin and said heavier olefin.

2. The process of claim 1 wherein effluent from the said disproportionation zone is passed directly to said polymerization zone without any substantial separation of any unconverted feed olefin, said lighter olefin and said heavier olefin from each other, the effluent from said polymerization zone is separated to produce a first separated stream comprising unconverted feed olefin and a second separated stream comprising said heavier olefin, and said first stream is recycled to said disproportionation zone.

3. The process of claim 2 wherein the contact of the feed olefin with the disproportionation catalyst and the contact of the effluent from the disproportionation zone with the polymerization catalyst occur consecutively in a single reactor vessel.

4. The process of claim 2 wherein the contact of the feed olefin with the disproportionation catalyst and the contact of the effluent from the disproportionation zone with the polymerization catalyst occur consecutively in separate reactor vessels.

5. The process of claim 1 wherein effluent from said disproportionation zone is separated in a separation zone to produce a first stream comprising unconverted feed olefin, a second stream comprising said lighter olefin and a third stream comprising said heavier olefin, said first stream is recycled to said disproportionation zone and said second stream is passed to said polymerization zone.

6. The process of claim 1 wherein said feed olefin is propylene, said lighter olefin is ethylene, and said heavier olefin is butene.

7. The process of claim 2 wherein said feed olefin is propylene, said lighter olefin is ethylene, and said heavier olefin is butene.

8. The process of claim 5 wherein said feed olefin is propylene, said lighter olefin is ethylene, and said heavier olefin is butene.

9. The process of claim 3 wherein said feed olefin is propylene, said lighter olefin is ethylene, and said heavier olefin is butene.

10. The process of claim 4 wherein said feed olefin is propylene, said lighter olefin is ethylene, and said heavier olefin is butene.

References Cited

UNITED STATES PATENTS

| | | | |
|---|---|---|---|
| 2,581,228 | 1/1952 | Bailey et al. | 260—683.15 |
| 2,866,790 | 12/1958 | Pitzer | 260—669 |
| 2,984,693 | 5/1961 | Cabbage | 260—683.42 |
| 3,159,688 | 12/1964 | Jennings et al. | 260—680 |
| 3,261,879 | 7/1966 | Banks | 260—683 |

DELBERT E. GANTZ, *Primary Examiner.*

R. H. SHUBERT, *Assistant Examiner.*